United States Patent Office 2,735,837
Patented Feb. 21, 1956

2,735,837

INTERPOLYMER OF 2,5-DIACETOXYSTYRENE, VINYL HYDROQUINONE MONOACETATE, VINYL HYDROQUINONE, AND ACRYLIC ACID

Louis M. Minsk, Delbert D. Reynolds, and Jack L. R. Williams, Rochester, N. Y., assignors to Eastman Kodak Company, Rochester, N. Y., a corporation of New Jersey No Drawing. Application April 15, 1952,
Serial No. 282,488

2 Claims. (Cl. 260—47)

This invention relates to certain interpolymers of vinyl hydroquinone and polymers and interpolymers of 2,5-diacetoxystyrene (including nuclear alkyl substituted derivatives thereof). The processes involved are disclosed in an application filed on even date herewith by us, Serial No. 282,487 and in another application filed on even date herewith by L. M. Minsk, Serial No. 282,489, now Patent No. 2,694,693.

Polymerized vinyl hydroquinone is described in an article by I. H. Updegraff and H. G. Cassidy, J. A. C. S., 71, 408, February 1949. According to their process vinyl hydroquinone was polymerized in an evacuated closed vessel by means of heating to a temperature of 125° C. for 100 hours. The product was a brittle solid having an amber color. According to Updegraff and Cassidy this polymer can advantageously be employed as an electron exchange polymer. Besides the employment of polyvinyl hydroquinone as an electron exchange polymer, it and its interpolymers have other uses such as disclosed in a copending application by L. M. Minsk and W. O. Kenyon filed on even date herewith, Serial No. 282,490, now Patent No. 2,710,801, wherein it is shown that polymers and interpolymers of vinyl hydroquinone are useful in photographic emulsions as antistain agents and have been found to reduce stain due to extraneously oxidized developer or to the wandering of oxidized developer. It is obvious that the utility of polymers and interpolymers of vinyl hydroquinone would be substantially improved by the more efficacious production of such product.

In addition to the process described by Updegraff and Cassidy, an article by Wenzke and Nieuwland, J. A. C. S., 46, 180 (1924), discloses that acetylene and hydroquinone unite to form a substance which appeared to polymerize on standing and which would seem to be an impure product comprising polyvinyl hydroquinone; however, Wenzke et al. did not apparently suspect the nature of this product. Our investigations have not been conducted according to the methods of Wenzke et al. due to the inherent difficulties of control and purification of the product obtained.

U. S. 2,006,517, dated July 2, 1935, discolses the preparation of vinyl phenols according to a process comprising the reaction of a phenol with a vinyl halide in the presence of a suitable condensing agent such as aluminum chloride. The term "vinyl phenol" is defined as including aromatic compounds having one or more hydroxyl groups attached to the nucleus and having a radical containing the vinyl group. The only examples given are phenol itself and substituted phenols such as cresols, hydrogenated phenols and the like. Processes as described by U. S. 2,006,517 cannot be satisfactorily employed in the preparation of vinyl hydroquinone and polymers thereof; this patent states that the polymerization can be conducted by exposure to light, by heating, or by employing catalysts such as uranium salts, benzoyl peroxide, etc. The use of catalysts such as benzoyl peroxide would be entirely unsatisfactory for the polymerization of vinyl hydroquinone since mutual interaction between vinyl hydroquinone and such a catalyst would prevent the accomplishment of any useful result. Such an undesirable situation is avoided by the process of our invention.

Thus, there is encountered in the polymerization and interpolymerization of vinyl hydroquinone, a major difficulty not normally present in the usual polymerization. Vinyl hydroquinone is a strong reducing agent, of the type often employed to inhibit the polymerization of organic unsaturated compounds. The polymerization of vinyl hydroquinone is therefore self-inhibited. The use of oxidizing catalysts encounters difficulty due to the undesirable interaction together with simultaneous darkening of the mixture.

It has now been found that polymerized vinyl hydroquinone and interpolymers thereof can be prepared by polymerizing 2,5-diacetoxystyrene (including alkyl derivatives thereof) or mixtures thereof with other unsaturated organic polymerizable compounds containing an aliphatic >C=C< group, followed by the deacetylation of such polymers.

Hereinafter, little mention will be made of the employment of nuclear substituted alkyl derivatives of 2,5-diacetoxystyrene and vinyl hydroquinone either in the processes involved or in the processes obtained; however, it is clearly obvious that such derivatives are fully equivalent to their parent compounds in each instance.

A method for preparing 2,5-diacetoxystyrene and nuclear substituted alkyl derivatives thereof is described in a copending application, Serial No. 282,456 filed on even date herewith, by D. D. Reynolds and J. L. R. Williams. Examples of the nuclear substituted alkyl derivatives which can be employed in accordance with the instant invention are 2,5-diacetoxymethylstyrene, 2,5-diacetoxyethylstyrene, etc.

It is an object of our invention to provide interpolymers of vinyl hydroquinone with organic polymerizable unsaturated compounds containing an aliphatic >C=C< group. A further object of our invention is to provide certain interpolymers of the type described which are oil soluble and useful an non-wandering reducing agents having antistain characteristics in some photographic emulsions. It is an additional object to provide polymers of 2,5-diacetoxystyrene and interpolymers thereof with the same class of organic unsaturated compounds. Other objects will become apparent hereinafter.

In preparing the interpolymers disclosed herein, it is advantageous to employ from about 10 to about 90 mole per cent of vinyl hydroquinone (or 2,5-diacetoxystyrene or derivative of either) in order to obtain interpolymers of vinyl hydroquinone which have advantageous properties in photographic emulsions. This range can be advantageously narrowed to from about 30 to about 60 mole per cent.

According to one aspect of the invention polymers of 2,5-diacetoxystyrene are provided which can be prepared by a process which comprises polymerizing the monomer in the presence of a catalyst suitable for polymerizing vinyl-type compounds; a process is also provided for preparing interpolymers of 2,5-diacetoxystyrene with an unsaturated polymerizable organic compound containing an aliphatic >C=C< group which comprises polymerizing a mixture of the monomers in the presence of catalysts such as have just been referred to. In accordance with another aspect of the invention polymers of vinyl hydroquinone are provided which can be prepared by a process which comprises polymerizing 2,5-diacetoxystyrene as described above and deacetylating the polymer so formed by treating it with a solution of strong acid in a lower aliphatic alcohol; interpolymers of vinyl hydroquinone are also provided which can be prepared by a process which comprises polymerizing 2,5-diacetoxystyrene with an unsaturated polymerizable organic compound containing an aliphatic $>C=C<$ group as described above and deacetylating the interpolymer so formed by treating it with a solution of strong acid in a lower aliphatic alcohol. A third aspect of the invention is set forth hereinbelow regarding the employment of azo bis isobutyronitrile as a catalyst to interpolymerize vinyl hydroquinone with other unsaturated organic compounds.

INTERPOLYMERS OF 2,5-DIACETOXYSTYRENE

The most advantageous method for accomplishing the polymerization of 2,5-diacetoxystyrene including interpolymers thereof is that method normally designated as the solution polymerization process although such polymerization can be effected in bulk, bead, or emulsion with or without the employment of light or catalysts. Heat alone can be employed to cause polymerization; however, it is advantageous to add a polymerization catalyst, which can be employed for the polymerization of organic unsaturated compounds containing an aliphatic $>C=C<$ group.

Advantageously, the polymerization is conducted according to the solution polymerization method which is well known in the art. In employing this method, it is advantageous to utilize the peroxy type catalysts which are equally well known in the art.

Examples of organic peroxy compounds which can be employed include acyl peroxides, e. g., benzoyl peroxide, acetyl peroxide, acetyl benzoyl peroxide, oleoyl peroxide, etc., dialkyl peroxides, e. g., diethyl peroxide, methyl ethyl peroxide, etc., peroxy acids, e. g., perbenzoic acid, peracetic acid, etc., tetrahydronaphthalene hydroperoxide, etc. Inorganic peroxy compounds include perborates, persulfates, percarbonates, perphosphates, peroxides, etc., e. g. magnesium peroxide, sodium persulfate, hydrogen peroxide, ammonium perborate, potassium perphosphate, etc. In some instances activators can be employed such as sodium sulfite, sodium bisulfite, etc. It is advantageous to employ an organic peroxy compound in accordance with the solution polymerization process.

The amount of peroxy catalyst which can be advantageously employed can be from about 0.25 to about 5 percent by weight based on the weight of the monomer or monomers being polymerized. Higher or lower quantities of catalyst can also be employed; however, it is most advantageous to employ from about 0.5 percent to about 3 percent by weight of the catalyst.

The unsaturated organic polymerizable compounds containing an aliphatic $>C=C<$ group which can be interpolymerized with 2,5-diacetoxystyrene include compounds having the formulas:

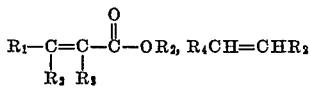

and

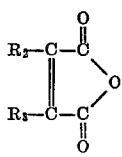

wherein $R_1$ represents a substituent selected from those consisting of a hydrogen atom and a carbalkoxy radical containing from 2 to 7 carbon atoms, $R_2$ represents a substituent selected from those consisting of an alkyl radical containing from 1 to 6 carbon atoms and a hydrogen atom, $R_3$ represents a substituent selected from those consisting of an alkyl radical containing from 1 to 6 carbon atoms, an aryl radical containing from 6 to 9 carbon atoms and a hydrogen atom, and $R_4$ represents a substituent selected from the group consisting of a carbamyl radical ($NH_2-CO-$), a cyano radical ($CN-$), and a radical having the formula $R_5-CO-$ wherein $R_5$ represents a substituent selected from the group consisting of an alkyl radical containing from 1 to 6 carbon atoms and an aryl radical containing from 6 to 9 carbon atoms. Each of the $R_2$ and $R_3$ substituents in the above formulas can be the same or different.

Examples of such compounds include maleic acid anhydride, ethyl maleic acid anhydride, etc., citraconic acid anhydride, phenyl maleic acid anhydride, monomethyl maleate, diethyl maleate, and other esters and half esters of maleic acid and derivatives thereof (e. g. esters and half esters of citraconic acid, etc.), acrylic acid, ethyl acrylate, methyl acrylate, methacrylic acid, methyl methacrylate, butyl methacrylate, methyl ethacrylate, ethyl ethacrylate, and other esters of acrylic acid and derivatives thereof, etc., atropic acid and its esters, etc., amides of these various acids, e. g. acrylamide, α-ethacrylamide, methacrylamide, etc., nitriles, e. g. acrylonitrile, α-methacrylonitrile, etc., alkyl-alkenyl ketones, aralkyl alkenyl ketones, etc., e. g. vinyl methyl ketone, acrylphenone, -phenylvinyl methyl ketone, ethyl isopropenyl ketone, etc., styrene, p-methylstyrene, 1-vinylnaphthalene, etc., etc.

Solvents which can be employed in accordance with the solution polymerization process include lower aliphatic ethers including cyclic ethers (e. g. 1,4-dioxane, diethyl ether, etc.), hydrocarbons, e. g. aromatic hydrocarbons (e. g. benzene etc.) and aliphatic hydrocarbons (e. g. cyclohexane, etc.), and lower aliphatic alcohols (e. g. methanol, ethanol, etc.). The selection of a solvent depends upon the characteristics of the reaction conditions and the compounds being polymerized. Advantageously, 1,4-dioxane can be employed as the solvent in most instances. However, it is obvious that other solvents than those named can also be employed and that some of those named may not be suitable in some instances depending upon the interpolymer being prepared, etc.

In conducting the polymerization of 2,5-diacetoxystyrene either alone or in admixture with other compounds being interpolymerized therewith, moderately elevated temperatures from about 40° C. to about 100° C. can be advantageously employed. However, higher or lower temperatures can also be employed. An all-glass reflux outfit can advantageously be employed in conducting the polymerization. The time required for substantial completion of the polymerization reaction depends upon the temperature and varies from just a few hours to several days. An inert atmosphere can be employed advantageously; however, such an atmosphere is not required. If an inert atmosphere is employed, nitrogen can be advantageously used.

The reaction of polymerization can advantageously be conducted in a moisture-free inert atmosphere, e. g. nitrogen, etc. However, this is not necessary and can be omitted although it is advantageous to exclude moisture.

INTERPOLYMERS OF VINYL HYDROQUINONE

The polymers and interpolymers of 2,5-diacetoxystyrene prepared as described above can be advantageously converted into polymers and interpolymers of vinyl hydroquinone by deacetylation which can be advantageously accomplished by contact with a solution of a strong acid in a lower aliphatic alcohol. In order to facilitate the removal of the acetyl groups, it is advantageous to perform the deacetylation in an acid medium because of the harmful effect that alkali has upon a hydroquinone nucleus. Moreover, in order to further facilitate the removal of the acetyl groups, it is advantageous to operate in an alcoholic medium rather than an aqueous medium. The acetyl groups can thus be quickly and smoothly removed by a type of deacetylation which can be termed alcoholysis. Since many of the interpolymers of 2,5-diacetoxystyrene are not soluble in the aliphatic alcohols, it is advantageous to add an inert solvent, in some instances, in order to facilitate the solution of the 2,5-diacetoxystyrene interpolymer in order that the entire reaction can be performed in a homogeneous phase.

The aliphatic alcohols which can be employed in the deacetylation are advantageously those which contain from 1 to 6 carbon atoms, e. g. ethyl alcohol, methyl alcohol, etc. The strong acids which can be employed include hydrogen chloride, sulfuric acid, phosphoric acid, trichloracetic acid, etc., all of which act as catalysts in facilitating the deacetylation by alcoholysis. Other strong acids, e. g. hydrogen bromide can also be employed; however, such acids should not deleteriously affect the hydroquinone nuclei in the polymer.

As the inert solvent which can be employed advantageously to facilitate the formation of a homogeneous deacetylation reaction mixture, it is advantageous to employ 1,4-dioxane; however, other inert solvents can be employed depending upon the nature of the interpolymer of 2,5-diacetoxystyrene being treated, e. g. ethers, alcohols, hydrocarbons, esters, aliphatic acids, etc.

The acid deacetylating catalyst which is advantageously employed in the following examples is hydrogen chloride and the aliphatic alcohol advantageously employed in methanol. It is advantageous to prepare at ice bath temperature a solution of hydrogen chloride in methanol whereby a solution having a normality of about 12 is obtained. This solution can then be employed in deacetylating 2,5-diacetoxystyrene polymers and interpolymers which have been advantageously dispersed or dissolved in a suitable dispersing medium or solvent such as benzene, methyl alcohol, etc.

In the preparation of the various vinyl hydroquinone polymers and interpolymers by deacetylation of the corresponding 2,5-diacetoxystyrene interpolymers, the operations employed in the examples given herein below did not attempt to carry the deacetylation to its ultimate completion in an endeavor to obtain the maximum vinyl hydroquinone content. The reactions set forth in these examples were usually halted when methanol solubility was reached, a purpose of such interruption of the reaction being to keep the introduction of color at a minimum. As a result, slightly lower than theoretical quantities of vinyl hydroquinone content were found to exist in the polymers upon analysis thereof. More drastic deacetylation than that employed in the examples can be employed to obtain practically quantitative deacetylation.

In accordance with the third aspect of the invention it has been found that vinyl hydroquinone can be polymerized employing azo-bis-isobutyronitrile, commercially sold as Porofor N. This catalyst has the following structure:

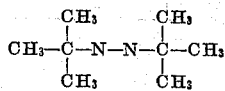

The polymerization employing this catalyst proceeds smoothly, accompanied by only very little discoloration. Using this catalyst, polymers of vinyl hydroquinone have been prepared, as well as interpolymers with unsaturated organic polymerizable compounds containing an aliphatic

group.

In conducting the polymerization, moderately elevated temperatures from about 40° C. to about 100° C. can advantageously be employed. However, higher or lower temperatures can also be employed. The time required for substantial completion of the polymerization reaction depends upon the temperature and varies from just a few hours to several hours; three or four hours are generally sufficient.

A catalytic amount of azo-bis-isobutyronitrile catalyst is employed to effect the polymerization; advantageously from about 1 to about 5% by weight based on the total weight of the monomers being polymerized is employed. Higher or lower percentages can also be employed.

An advantageous method for accomplishing the polymerization is that normally designated as the solution polymerization process. Solvents which can be employed according to this well-known process in general include 1,4-dioxane, lower aliphatic ethers containing from two to ten carbon atoms, aliphatic hydrocarbons such as hexane, cyclohexane, pentane, octane, and other homologous hydrocarbons containing from five to ten carbon atoms, aromatic hydrocarbons such as benzene, toluene, xylene, and other related members of this homologous series containing from six to twelve carbon atoms, and any other inert organic solvent which does not deleteriously affect vinyl hydroquinone or the α,β-unsaturated organic compound which may also be present therewith.

The reaction of polymerization can advantageously be conducted in a moisture-free inert atmosphere such as nitrogen, etc. However, this is not necessary and can be omitted although it is preferred to exclude moisture to the greatest extent practicable, i. e. the conditions are substantially anhydrous.

The unsaturated compounds which can be interpolymerized with vinyl hydroquinone or nuclear alkyl-substituted homologs thereof employing azo-bis-isobutyronitrile as the catalyst include those compounds having the general formulas set forth hereinabove. Advantageously, those compounds set forth above having the following formulas can be most advantageously employed in this process to produce interpolymers:

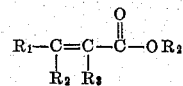

and

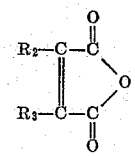

wherein $R_1$, $R_2$ and $R_3$ have the representation set forth hereinbefore. Examples of such compounds are given above.

The following examples will serve to further illustrate this invention as regards interpolymers of vinyl hydroquinone or 2,5-diacetoxystyrene with unsaturated organic compounds of the types described hereinabove.

*Example 1.—Acrylic acid interpolymer with 2,5-diocetoxystyrene*

In an all-glass reflux outfit were placed 9.72 grams of 2,5-diacetoxy styrene, 6.0 grams of acrylic acid, 36.2 ml. dry 1,4-dioxane, and 0.156 gram of benzoyl peroxide. The reaction was heated in an 80° C. bath for 5¼ hours. A moderately viscous almost colorless dope was obtained. This was diluted to five volumes with 1,4-dioxane and precipitated in 2½ liters of ether. The precipitate was was given two extractions in a beaker with two 2½ liter portions of ether and dried in a vacuum desiccator over calcium chloride under constant water pump vacuum. Yield 12.9 grams.

*Analysis.*—Acrylic acid=31.0 percent. Theory 38.2. Acetyl=22.1 percent equivalent to 56.5 percent diacetoxy styrene.

*Example 2.—Methacrylic acid interpolymer with 2,5-diacetoxystyrene*

Six grams of methacrylic acid, 9.72 grams of 2,5-diacetoxy styrene, 31.2 ml. of dry 1,4-dioxane, and 0.156 gram of benzoyl peroxide were heated in an all-glass reflux outfit for 4½ hours in an 80° C. bath. The moderately viscous dope obtained was diluted with 125 ml. of 1,4-dioxane and precipitated in 2½ liters of ether. The precipitate was treated as in Example 1 above. Yield 14.9 grams. Analysis: Methacrylic acid=31.5 percent; acetyl=23.3 percent equivalent to 59.6 percent 2,5-diacetoxy styrene.

Example 3.—Maleic anhydride interpolymer with 2,5-diacetoxystyrene

In an all-glass reflux outfit were placed 15 grams of 2,5-diacetoxy styrene, 6.9 grams maleic anhydride, 45 ml. dry benzene, and 0.150 gram benzoyl peroxide. The reaction mixture was heated at 85–90° C. for 2 hours and cooled. The polymer had precipitated as a hard cake. The supernatant benzene was poured off and replaced by 300 ml. of dry acetone. With shaking a smooth dope was obtained. This was poured in a fine stream into 1½ liters of dry benzene. The precipitate was extracted with dry benzene and dried in a vacuum desiccator over calcium chloride under constant water pump, with a tube of calcium chloride betwen pump and desiccator. The yield was 18.5 grams of tan friable product.

The interpolymers of Examples 1, 2 and 3 include acid groups capable of forming salts and are water soluble. Examples 4 through 13 set forth ten interpolymers which are not capable of forming salts and which are oil-soluble rather than water-soluble.

Examples 4 to 12.—Additional interpolymers with 2,5-diacetoxystyrene

The following table presents the pertinent data involved in forming nine interpolymers according to processes analogous to those described in Examples 1, 2 and 3, i. e., the polymerization was conducted in 1,4-dioxane, and, after polymerization, the dopes were further diluted to precipitation viscosity with dioxane. In all nine examples the polymerization temperature was 50° C. The number (1) represents 2,5-diacetoxystyrene and the number (2) represents the material interpolymerized therewith.

Example 14.—Acrylic acid interpolymer with vinyl hydroquinone

Seventy grams of 2,5-diacetoxy styrene-acrylic acid interpolymer were dispersed in a mixture of 370 ml. benzene and 200 ml. methyl alcohol. To the dope there were then added 30 ml. of a methyl alcoholic solution of hydrogen chloride (saturated at ice bath temperature—Normality=12.23). Upon addition of the acid methanol the dope turned cloudy and 100 ml. more of methanol were added to clear. The reaction mixture was left at room temperature. There was some spontaneous warming up but no cooling was applied. After 12 minutes of reaction the dope again became turbid and an additional 75 ml. of methanol were added. One hour after the addition of the catalyst, the dope was poured into 12 liters of ether with stirring. The precipitate was given three extractions was 2-liter portions of ether, followed by three with 2-liter portions of benzene. The product was dried in a vacuum desiccator over calcium chloride under constant water pump vacuum. Yield 51 grams.

Example 15.—Methacrylic acid interpolymer with vinyl hydroquinone

Eight grams of diacetoxystyrene-methacrylic acid interpolymer were dispersed in 60 ml. of methyl alcohol. A smooth but turbid dope was obtained. To this dope was added 2 ml. of 12.31 N solution of hydrogen chloride in methanol. The reaction mixture was stirred on a rotor at room temperature. In a short time, the turbidity disappeared. After one hour of reaction, one-half of the dope was precipitated in 1500 ml. of ether. The precipitate was given two extractions with 800 ml. portions of

TABLE I.—INTERPOLYMERS OF 2,5-DIACETOXY STYRENE

| Example No. | Monomer (2) | grams Mono-mer (2) | grams 2,5-Diacetoxy Styrene | ml. Dioxane | grams Bz$_2$O$_2$ | Polymer-ization Time, days | Precipi-tant | grams Yield | Wt. Percent Mixed (1) | Wt. Percent Mixed (2) | Wt. Percent Found (1) | Wt. Percent Found (2) |
|---|---|---|---|---|---|---|---|---|---|---|---|---|
| 4 | Methacrylate | 10.0 | 22.0 | 32.0 | 0.16 | 6 | Water | 27.8 | 68.8 | 31.2 | 71.7 | 28.4 |
| 5 | Styrene | 10.4 | 22.0 | 32.4 | 0.162 | 6 | do | 28.5 | 68. | 32. | 71.8 | 28.2 |
| 6 | do | 20.8 | 44.0 | 64.8 | 0.324 | 1 | do | 55. | 68. | 32. | 74.2 | a 25.8 |
|   |   |   |   |   |   |   |   |   |   |   | 67.3 | b 32.7 |
| 7 | Methyl acrylate | 8.6 | 22.0 | 30.6 | 0.153 | 6 | do | 26.9 | 67.4 | 32.6 | 76.2 | 23.8 |
| 8 | Butyl acrylate | 12.8 | 22.0 | 34.8 | 0.174 | 8 | do | 29.5 | 63.2 | 36.8 | 78.0 | b 22.0 |
|   |   |   |   |   |   |   |   |   |   |   | 75.6 | c 24.4 |
| 9 | Butyl methacrylate | 14.3 | 22.0 | 36.4 | 0.182 | 8 | do | 32.5 | 60.6 | 39.4 | 64.2 | b 35.8 |
|   |   |   |   |   |   |   |   |   |   |   | 67.7 | c 32.3 |
| 10 | p-methyl styrene | 5.9 | 11.0 | 17.0 | 0.170 | 4 | do | 15.5 | 65.1 | 34.9 | 68.9 | 31.1 |
| 11 | 3,4-Dimethyl styrene | 6.6 | 11.0 | 17.6 | 0.176 | 4 | Methanol | 14.0 | 62.4 | 37.6 | 64.7 | 35.3 |
| 12 | 1-Vinyl naphthalene | 3.0 | 3.0 | 6. | 0.060 | 4 | do | 4.2 | 50.0 | 50.0 | 48.5 | 51.5 | a Calculated from carbon and hydrogen.
b Calculated from acetyl.
c Calculated from yield assuming 100% polymerization of the 2,5-diacetoxy styrene.

Example 13.—Styrene interpolymer with 2,5-diacetoxymethylstyrene

In a test tube were placed 1.17 grams of diacetoxy methyl styrene, 1.04 grams styrene, 2.2 ml. of 1,4-dioxane, and 0.011 gram of benzoyl peroxide. The air was displaced by nitrogen and the test tube, stoppered by a cork wrapped in aluminum foil, was immersed in a 50° C. water bath. After four days, 0.022 gram more benzoyl peroxide was added and heating at 50° C. continued. After three days additional at 50° C., a very viscous clear light yellow dope was obtained. This was diluted with 12 ml. of 1,4-dioxane and poured into 40 ml. absolute ethyl alcohol. The white fibrous precipitate was filtered onto a Buchner funnel, washed on the funnel with absolute alcohol, and then dried at room temperature in a tared dish in a desiccator over calcium chloride under constant water pump vacuum. Yield 1.67 grams.

Analysis.—C=77.8, H=6.8; O (by difference)=15.4 equivalent to 56.3 percent diacetoxy methyl styrene in the interpolymer. Theory 53 percent.

The following examples illustrate the deacetylation of the polymers containing 2,5-diacetoxystyrene whereby polymers can be obtained containing vinyl hydroquinone.

benzene, filtering after each. The product was dried in a vacuum desiccator over calcium chloride under constant water pump vacuum. After four hours of reaction the remainder of the dope was precipitated and the precipitate treated as above.

Example 16.—Maleic anhydride interpolymer with vinyl hydroquinone

Eight grams of diacetoxy styrene-maleic anhydride interpolymer were dispersed in 60 ml. of 1,4-dioxane. Twenty ml. of methyl alcohol were added with stirring. Precipitation followed by resolution occurred. Four ml. of methyl alcoholic HCl were then added and the reaction left at room temperature. After 20 minutes an additional 30 ml. of methyl alcohol were added. Again there was local precipitation followed by resolution. After three hours of reaction a sample could be infinitely diluted by methyl alcohol without precipitation. One-half of the dope was precipitated in one liter of ethyl ether. The precipitate was given three extractions with 800 ml. portions of benzene and dried in a vacuum desiccator over calcium chloride under constant water pump vacuum. After five hours of reaction, the remainder of the dope was precipitated and treated as above.

Examples 17 to 26.—Interpolymers with vinyl hydroquinone

The interpolymers of 2,5-diacetoxystyrene listed in Table I were deacetylated to give the corresponding vinyl hydroquinone interpolymers. The general procedure used consisted in dispersing the 2,5-diacetoxy styrene interpolymer in a mixture of 1,4-dioxane and methyl alcohol, adding to it a measured quantity of a solution of hydrogen chloride in methyl alcohol, saturated at ice bath temperature. The reaction mixture was well shaken and then left at room temperature with occasional shaking until a small portion of the dope could be infinitely diluted with methyl alcohol without the formation of a precipitate. At the beginning, after the addition of the methanolic HCl, the reaction mixture was usually cloudy but cleared in a few minutes and remained clear throughout the course of the ester interchange though a tan coloration, increasing with time, usually appeared. It is for the latter reason, that the samples were precipitated shortly after complete methanol solubility was reached, even though the reaction may not have gone to completion. Water was the usual precipitant. The precipitates were washed free from chloride and dried at room temperature under constant water pump vacuum over calcium chloride. Pertinent data are given in Table II.

Example 29.—Interpolymer of vinyl hydroquinone and maleic anhydride

In an all-glass reflex apparatus protected from moisture by a calcium chloride tube was placed 2.72 grams of vinyl hydroquinone, 1.96 grams of maleic anhydride, 0.12 gram of Porofor N, and 19 cc. of dry benzene. The reaction vessel was immersed in a water bath at 60° C. The temperature of the bath was slowly raised. The reactants slowly dissolved to yield a clear, light-yellow solution. At about 87° C. bath temperature, the reaction solution began to grow cloudy and then turned to a slurry. The bath temperature was maintained at 90° C. for 1¼ hours, during which time the mixture was refluxed and the amount of precipitate increased. The mixture was then diluted to 400 cc. with benzene, well stirred, and the solid filtered onto a Buchner funnel. The precipitate was given two additional extractions with 350 cc. of benzene, each for about 1 hour with occasional stirring, followed by filtering onto a Buchner funnel after each extraction. The product was dried in a vacuum desiccator under constant water pump vacuum. The yield was 2.6 grams of light cream-colored friable product. Cerium sulfate titration indicated that each gram of this interpolymer contained the equivalent of 0.297 gram of combined vinyl hydroquinone.

TABLE II.—OIL SOLUBLE INTERPOLYMERS

| Example No. | 2nd Component | Parent Polymer from Example No. | grams Polymer | ml. Dioxane | ml. MeOH | ml. Acid | Reaction Time (min) | grams Yield |
|---|---|---|---|---|---|---|---|---|
| 17 | Methyl methacrylate | 4 | 10 | 50 | 50 | 6 | 60 | 6.0 |
| 18 | Methyl acrylate | 7 | 10 | 50 | 50 | 6 | 45 | 7.0 |
| 19 | Styrene | 5 | 10 | 50 | 50 | 6 | 47 | 7.0 |
| 20 | do | 5 | 15 | 75 | 75 | 9 | 60 | 12.0 |
| 21 | do | 6 | 50 | 250 | 250 | 30 | 65 | 36.0 |
| 22 | Butyl acrylate | 8 | 20 | 100 | 100 | 12 | 40 | 14.0 |
| 23 | Butyl methacrylate | 9 | 20 | 100 | 100 | 12 | 40 | 14.5 |
| 24 | p-Methyl styrene | 10 | 10 | 50 | 50 | 10 | 60 | 7.0 |
| 25 | 3,4-Dimethyl styrene | 11 | 10 | 50 | 50 | 10 | 60 | 8.2 |
| 26 | 1-Vinyl naphthalene | 12 | 3 | 15 | 15 | 3 | 70 | 2.5 |

Example 27.—Styrene interpolymer with vinyl methyl hydroquinone

One gram of the interpolymer of styrene with 2,5-diacetoxymethylstyrene (Example 13) was dispersed in 5 ml. of 1,4-dioxane. To the dope 4 ml. of methyl alcohol were added, 1 ml. at a time, with stirring after each addition. A clear dope was obtained. To this was added 1.2 ml. of methyl alcohol, saturated with hydrogen chloride at ice bath temperature. A copious white precipitate formed which with stirring at room temperature slowly redissolved. After 1¼ hours of reaction the dope was diluted with ½ volume of methanol and poured into 600 ml. of distilled water. The precipitate was washed with distilled water until chloride free and dried in a vacuum desiccator over calcium chloride under constant water pump vacuum. The yield was 0.65 gram.

Example 28.—Interpolymer of vinyl hydroquinone and acrylic acid

One gram of vinyl hydroquinone, one cc. of acrylic acid, one cc. of dry 1,4-dioxane and 0.025 gram of Porofor N. was heated as in Example 1 above. The mixture became viscous and after three hours of heating a viscous dope was obtained. This was diluted with 1,4-dioxane and poured into 400 cc. of benzene to precipitate the interpolymer. The interpolymer was then extracted with benzene and dried in a vacuum desiccator under constant water pump vacuum. The yield was 1.3 grams of a white friable solid. Upon analysis for vinyl hydroquinone by cerium sulfate titration, one gram of this interpolymer was found to contain the equivalent of 0.447 gram of combined vinyl hydroquinone.

In addition to employing vinyl hydroquinone as described hereinabove, nuclear alkyl substituted homologs thereof can also be employed, e. g. methyl vinyl hydroquinone, ethyl vinyl hydroquinone, etc., where the lower alkyl group is attached to the benzene nucleus.

Based on the preceding description it is clear that this invention provides interpolymers of a hydroquinone derivative selected from the group consisting of those having the formulas:

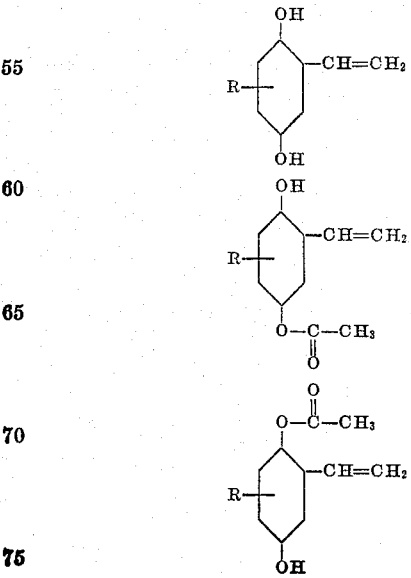

and

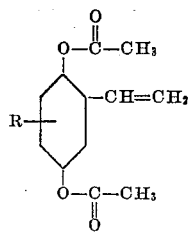

wherein R represents a hydrogen atom or an alkyl group containing from 1 to 4 carbon atoms, and an α,β-unsaturated compound having one of the following formulas:

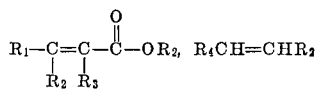

and

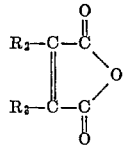

wherein $R_1$ represents a substituent selected from those consisting of a hydrogen atom and a carbalkoxy radical containing from 2 to 7 carbon atoms, $R_2$ represents a substituent selected from those consisting of an alkyl radical containing from 1 to 6 carbon atoms and a hydrogen atom, $R_3$ represents a substituent selected from those consisting of an alkyl radical containing from 1 to 6 carbon atoms, an aryl radical containing from 6 to 9 carbon atoms and a hydrogen atom, and $R_4$ represents a substituent selected from the group consisting of a carbamyl radical ($NH_2$—CO—), a cyano radical (CN—), and a radical having the formula $R_5$—CO— wherein $R_5$ represents a substituent selected from the group consisting of an alkyl radical containing from 1 to 6 carbon atoms and an aryl radical containing from 6 to 9 carbon atoms. Each of the $R_2$ and $R_3$ substituents in the above formulas can be the same or different.

What we claim is:

1. An interpolymer of 2,5-diacetoxystyrene, vinyl hydroquinone monoacetate, at least 10 mole percent of vinyl hydroquinone and at least 10 mole percent of acrylic acid.

2. A process for deacetylating a copolymer of from 10 to 90 mole percent of 2,5-diacetoxystyrene and from 90 to 10 mole percent of acrylic acid which comprises (1) dispersing this copolymer in a mixture of a major amount of benzene and a minor amount of methyl alcohol to form a resinous dope, (2) admixing this resinous dope with a solution in methyl alcohol of hydrochloric acid dissolved at ice bath temperature so as to produce a normality of about 12, (3) adding additional methyl alcohol sufficient to clarify the cloudiness of the acidified resinous dope and maintaining the clarified condition by adding further additional methyl alcohol, and (4) admixing this mixture with diethyl ether so as to precipitate a deacetylated copolymer of 2,5-diacetoxystyrene, vinyl hydroquinone monoacetate, at least 10 mole percent vinyl hydroquinone and at least 10 mole percent of acrylic acid.

References Cited in the file of this patent

UNITED STATES PATENTS

| 2,047,398 | Voss | July 14, 1936 |
| 2,276,138 | Alderman | Mar. 10, 1942 |
| 2,471,959 | Hunt | May 31, 1949 |
| 2,552,329 | Kropa | May 8, 1951 |
| 2,668,802 | Evans et al. | Feb. 9, 1954 |
| 2,700,029 | Cassidy | Jan. 18, 1955 |

FOREIGN PATENTS

| 807,440 | Germany | June 28, 1951 |
| 813,080 | Germany | Sept. 6, 1951 |

OTHER REFERENCES

Updegraff: Jour. of the Amer. Chem. Soc., vol. 71, pages 407–410, 1949.

Schubert: Analytical Chemistry, vol. 22, pages 1359–1368, November 1950.

Chem. and Eng. News, vol. 29, page 4942, November 19, 1951.